(No Model.)
T. VANIER.
Machine for Trimming Boxes.
No. 236,120. Patented Dec. 28, 1880.
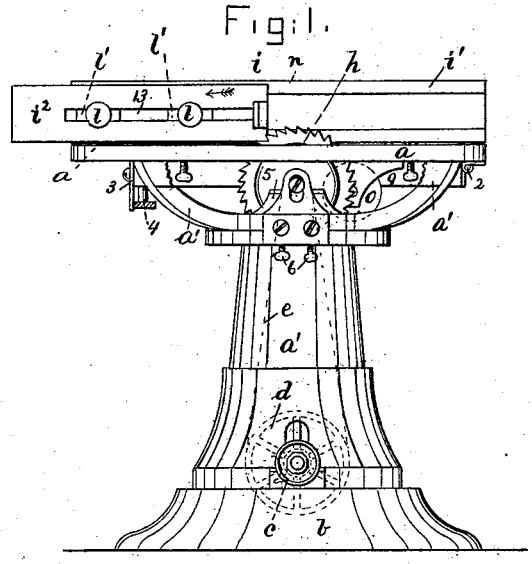
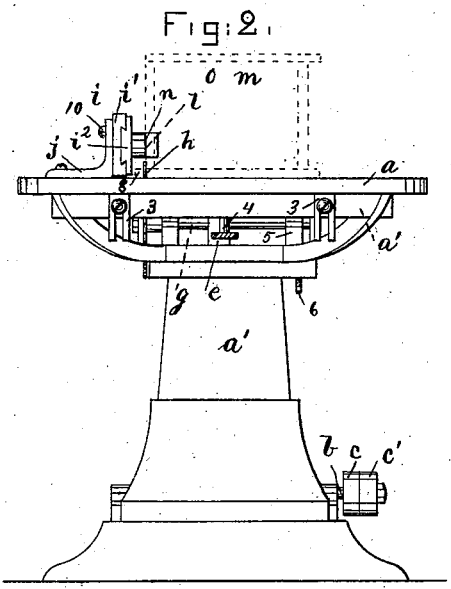
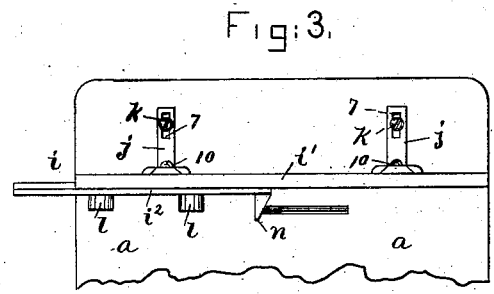
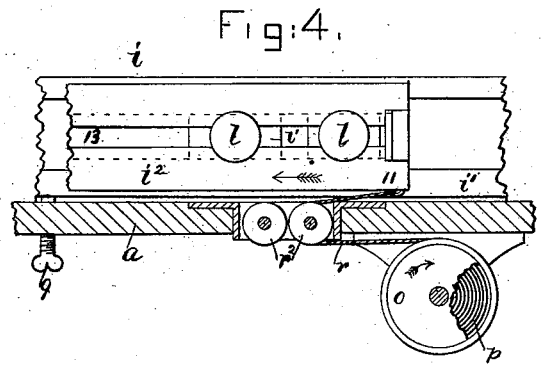
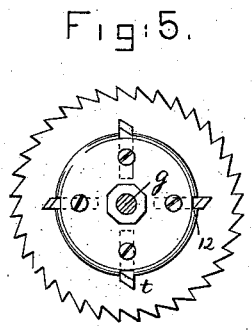
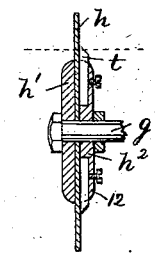
WITNESSES.
Arthur Reynolds
L. F. Connor
INVENTOR.
Timothée Vanier
by Crosby & Gregory Attys.

UNITED STATES PATENT OFFICE.

TIMOTHÉE VANIER, OF BOSTON, MASSACHUSETTS.

MACHINE FOR TRIMMING BOXES.

SPECIFICATION forming part of Letters Patent No. 236,120, dated December 28, 1880.

Application filed September 9, 1880. (No model.)

*To all whom it may concern:*

Be it known that I, TIMOTHÉE VANIER, of Boston, county of Suffolk, and State of Massachusetts, have invented an Improvement in Machines for Trimming Boxes, of which the following description, in connection with the accompanying drawings, is a specification.

My invention relates to a machine for trimming the edges of boxes and other similar articles.

In the manufacture of boxes the rectangular heads or ends are usually made of the proper size, after which the sides of the same width are fastened thereto, and a top and bottom are put on.

It is usually the case that after a box is put together in the process of making the sides and top and bottom project beyond the ends, and in a similar manner the top and bottom project beyond or overhang the sides; and it is the object of the present invention to produce a machine for trimming off the said overhanging edges even with the plane of the face of the box which they overhang.

I have devised a gage to be used with a circular saw and saw-table of usual construction, and adapted to present the work to the saw with the face to which the edges are to be trimmed precisely in line with the saw, which will consequently cut off whatever projects beyond the said face, irrespective of the length of the said projecting portion.

The invention consists, first, in the combination, with a saw and supporting-table therefor, of ordinary construction, of a sliding gage having one or more projections properly placed to fall within the projecting edges of a box when presented to the gage, to engage the face of the box within the said edges and guide and gage it relative to the said face, irrespective of the amount that the edges project. In order to bring the gaging ends of the said projections in line with the saw the whole gage may be moved to or from the saw and held in adjusted position in any suitable manner. The table has a vertical adjustment relative to the saw, which runs in bearings in the standard of the table, so that the amount that the cutting-edge of the saw projects through the table may be regulated according to the thickness of the stock to be trimmed off.

The saw thus trims the edge of the face of the box lying on the table, cutting it off even with the face rising up from the table, and the height of the table relative to the saw should be such that the latter will not cut much higher than the said edge. It is desirable that the gaging-projections should engage the gaging-surface as near to the edge to be trimmed as possible, so that the trimmed portion will be even with the said surface or form a continuation thereof, even if the said surface should be warped or irregular. The gage is made adjustable vertically in order to enable the said projections to be brought near to the edge to be trimmed, the gage being moved downward if the stock be thin, or up if it be thick. The gaging projections are made movable, so as to fit different sizes of work, it being necessary to place them in proper position to avoid meeting any of the projecting edges. The gage has at its front end a long projection, to pass in front of and engage the forward-end of the box, to thereby cause the gage to travel with the box as it is moved past and trimmed by the saw.

The invention further consists in the combination, with the sliding gage, of a retractor arranged to automatically draw the said gage back, after an edge has been trimmed, to the proper position just in front of the saw to enable the box to be again presented to it, thus greatly facilitating the work. The said retractor consists of a spring coiled in a drum over which a flexible cord or chain is wound, and, after passing over suitable guiding-pulleys, is connected with the sliding gage in such manner that the forward movement of the gage causes the spring to be coiled more tightly.

Figure 1 is a side elevation, and Fig. 2 a front elevation, of a machine for trimming boxes; Fig. 3, a plan view of a portion thereof; Fig. 4, a sectional detail, showing the sliding gage and its retractor enlarged, and Figs. 5 and 6 a side elevation and section of the saw detached, showing the chamfering cutters connected therewith.

The saw-table $a$, its standard $a'$, the driving-shaft $b$, with fast and loose pulleys $c$ $c'$, and pulley $d$, connected by a belt, $e$, with the pulley on the saw-arbor $g$, and the saw $h$, rotated thereby, may be of any usual construction. The table $a$ is hinged upon the standard portion $a'$ at 2, and is provided with guiding-lugs 3 and an adjusting-screw, 4, at its other end, to enable its height to be adjusted relative to the base portion, $a'$, to thus regulate the distance that the saw projects through the table, the bearings of the saw being in the base portion, $a'$. The bearing 5 of the saw-arbor $g$ is made vertically adjustable by the screws 6, to slightly vary the angle which the saw makes with the table.

The gage $i$ is composed of a stationary portion, $i'$, and a sliding portion, $i^2$, provided with a dovetail-shaped guide to give it a steady longitudinal movement in the fixed position.

The fixed portion $i'$ of the gage is held fast upon the table by suitable brackets $j$, having one arm resting on the table and the other one extended up therefrom and connected with the fixed portion $i'$ of the gage. The arms of the brackets $j$ that rest on the table are slotted, as shown at 7, to enable them and the connected gage to be moved toward or from the saw-blade, and when in proper position are secured by the set-screws $k$.

The main part of the moving portion $i^2$ of the gage is normally placed at a greater distance from the saw-blade than the maximum amount of projection of the edges to be trimmed, as shown in Figs. 2 and 3, so that the said projecting portion will not touch and be guided by the gage.

Upon the moving portion $i^2$ are a series of gaging-projections, $l$, connected therewith in any suitable manner, the said projections being adapted to engage the face of a box within but near to the edge to be trimmed, as shown in Fig. 2, where the box is shown in dotted lines at $m$, and the edge which is being removed or trimmed off at 8.

The gage should be properly set to bring the gaging-faces of the projections $l$ exactly in line with the saw-blade, so that the strip 8 will be removed even with the face of the box resting against the said projections. It is desirable that the projections $l$ should engage the face of the box as near as possible to the edge 8 being trimmed, as the said face might be warped or irregular, so that if the said gaging-projections rested against it at points at a considerable distance from the edge the saw might cut within or without that portion of the face nearest it and not in exact line therewith. To attain this result the whole gage $i$ is made vertically adjustable in the arms of the brackets $j$, extended up from the table, the said arms being dovetail-shaped and fitting in corresponding guides in the stationary portion $i'$.

The gage may be properly elevated by the thumb-screws 9, and held in adjusted position by set-screws 10, its position being regulated by the thickness of the stock being trimmed, it being placed to bring the projections $l$ a slight distance above the edge that the saw is to cut, so that they will not interfere with the said edges, which will be wholly below them, as shown in Fig. 2, and will be just above, so as not to be cut by the saw.

A long projection, $n$, on the front end of the moving portion $i^2$ of the gage is extended out over the edge of the saw, and is adapted to engage the front end of the box, to cause the gage to travel with the box when pressed forward against the saw. After the box has been pushed forward and the saw has acted upon it to trim the projecting edge, as shown in Fig. 2, it is moved away from the saw a sufficient distance to disengage the projection $n$, whereupon the sliding portion $i^2$ of the gage is drawn back by the retractor, shown in Fig. 4 as a drum, $o$, enclosing a coiled spring, $p$, properly connected with the said drum to impart to it a rotary motion in the direction of the arrow thereon. A cord, $r$, is connected at one end with the said drum, and, being partly wound thereon, is carried up through the saw-table between two guiding-pulleys, $r^2$, and connected at 11 with the forward end of the sliding portion $i^2$ of the gage, so that the drum $o$, in rotating under the action of the spring-pin in the direction of the arrow, draws the gage $i^2$ back, as indicated by the arrow thereon, until the point 11 is just above the space between the guiding-pulleys $r^2$, when the sliding gage is in proper position to again receive and guide the box, which will, in the mean time, be turned to present a new projecting edge to the saw.

It will be seen that when trimming the ends of the box the two edges extending upward from the table may project, as well as the edge lying on the table and being trimmed, and, in order that these upwardly-extended projecting edges may not touch the gaging-surfaces of the projections $l$, the said projections are made movable in the sliding portion $i^2$ of the gage, so that they may be properly placed with relation to the shape of the boxes worked upon always to pass between the projecting edges of the box and to come in contact with the face of the box that it is desired to trim the edges even with.

To enable the projections $l$ to be placed at any desired position in the sliding portion $i^2$ of the gage, the said projections are connected by screw-threads with blocks $l'$, fitted in a groove in the rear side of the sliding portion $i^2$ of the gage, the shanks of the screws passing through a longitudinal slot in the said sliding portion, and the projections $l$ being held in any desired position by tightening up the screws so as to grasp the said sliding portion at the edges of the slot 13, between the projections $l$ and blocks $l'$.

By having a considerable number of projections $l'$ the box may be properly trimmed, even if somewhat warped or irregular, the operator always keeping it pressed against the projection $l$ which is nearest to the cutting-edge of the saw.

The saw-blade $h$ is held in position upon its arbor $g$ between two collars, $h'$ $h^2$. The collar $h^2$ on the side away from the gage $i$ is provided with one or more grooves, 12, to receive cutters $t$, having their cutting-edges inclined to the face of the saw, as shown in Fig. 6, and adapted, while the saw is removing the projecting edge of the box, to bevel or chamfer off the angles of the trimmed box. The points of the cutters extend slightly above the plane of the saw-table, which is indicated by the dotted line in Fig. 6.

I am aware that gages have been made having a fixed portion adjustable in position on the frame-work and a movable portion guided thereon and adapted to move with the stock as it is presented to the saw; but such gages are intended to control the position of the portion of the stock lying between them and the saw, while my improved gage is intended to control the position of the stock lying on the side of the saw opposite to the gage.

I claim—

1. In a machine for trimming boxes and similar articles, a saw and a saw-table and a sliding gage provided with projections to engage and guide the surface that it is desired to trim even with without touching the uneven portions that are to be trimmed off, substantially as described.

2. In a trimming-machine, the saw and saw-table and gage composed of a fixed portion and a sliding portion guided thereon and provided with gaging-projections extended to the plane of the saw-blade, as described, to control the position of the stock lying beyond it, and means to adjust the height of the said gage above the saw-table, as and for the purpose set forth.

3. In a trimming-machine, the sliding gage provided with a series of gaging-projections movable thereon to cause the work to be properly presented to the saw, and a projection to be engaged by the work to cause the gage to be moved forward therewith, substantially as described.

4. In a trimming-machine, a gage composed of a fixed portion and a sliding portion guided thereon and provided with a longitudinal slot and groove, combined with a block movable in the said groove and gaging-projections connected therewith to grasp and remain fixed on the said sliding portion when placed in proper position in the said groove, substantially as described.

5. The combination, with a sliding gage, of a retracting-drum and coiled spring therein, and a flexible connector between the said drum and gage, and guide-pulleys $r^2$ therefor, arranged as described relative to the saw, whereby the gage is automatically brought to a suitable position to receive the work, substantially as described.

In testimony whereof I have signed my name to this specification in the presence of two subscribing witnesses.

TIMOTHÉE VANIER.

Witnesses:
JOS. P. LIVERMORE,
L. F. CONNOR.